(12) United States Patent
Nonoyama et al.

(10) Patent No.: US 6,257,061 B1
(45) Date of Patent: Jul. 10, 2001

(54) CAPACITIVE PHYSICAL-QUANTITY DETECTION APPARATUS

(75) Inventors: Shigeru Nonoyama, Aichi-ken; Shigenori Yamauchi, Nisshin, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/342,097

(22) Filed: Jun. 29, 1999

(30) Foreign Application Priority Data

Jun. 30, 1998 (JP) ................................................ 10-185083
Apr. 15, 1999 (JP) ................................................ 11-108454

(51) Int. Cl.[7] ............................................. G01P 15/125
(52) U.S. Cl. ................................. 73/514.32; 73/514.18; 324/661
(58) Field of Search ........................... 73/514.16, 514.18, 73/514.32, 718, 724, 862.61; 361/280, 283.1, 283.3; 324/661, 672, 678, 686, 162

(56) References Cited

U.S. PATENT DOCUMENTS

| 5,325,065 | * | 6/1994 | Bennett et al. | 73/514.32 |
|---|---|---|---|---|
| 5,454,266 | * | 10/1995 | Chevroulet et al. | 73/514.18 |
| 5,473,946 | * | 12/1995 | Wyse et al. | 73/514.18 |
| 5,506,454 |  | 4/1996 | Hanzawa et al. | 307/10.1 |
| 5,540,095 |  | 7/1996 | Sherman et al. | 73/514.18 |
| 5,583,290 |  | 12/1996 | Lewis | 73/514.18 |
| 5,612,494 | * | 3/1997 | Shibano | 73/514.32 |
| 5,748,004 | * | 5/1998 | Kelly et al. | 73/514.32 |
| 5,751,154 | * | 5/1998 | Tsugai | 73/514.32 |
| 5,821,421 | * | 10/1998 | Le Reverend | 73/514.32 |

FOREIGN PATENT DOCUMENTS 5-322921   12/1993   (JP) .

* cited by examiner

Primary Examiner—Helen Kwok
(74) Attorney, Agent, or Firm—Pillsbury Winthrop LLP

(57) ABSTRACT

A capacitive physical-quantity detection apparatus includes a movable electrode (2d) which is displaced in response to a physical quantity. A fixed electrode (3, 4) opposed to the movable electrode forms a capacitor in conjunction with the movable electrode. A signal applying device (23, 24) operates for applying a first signal between the movable electrode and the fixed electrode. The first signal is periodic, and has at least a first time period for detection of a capacity variation and a second time period for displacement of the movable electrode to implement self diagnosis. A C-V conversion circuit (21) operates for generating a voltage which depends on a variation in a capacitance of the capacitor during the first time period. A signal processing circuit (22) operates for processing the voltage generated by the C-V conversion circuit into a second signal depending on the physical quantity. A changing device (23) operates for changing the first signal in the second time period between a state for execution of self diagnosis and a state for unexecution of self diagnosis. The first signal in the state for execution of self diagnosis applies a pseudo physical quantity to the movable electrode.

20 Claims, 8 Drawing Sheets

CAPACITIVE PHYSICAL-QUANTITY DETECTION APPARATUS

BACKGROUND OF THE INVENTION

1. Field of the Invention

This invention relates to a capacitive-type apparatus for detecting a physical quantity such as an acceleration, an angular velocity, or a pressure.

2. Description of the Related Art

In a typical capacitive physical-quantity detection apparatus, a movable electrode and a fixed electrode are opposed to each other to form a capacitor, and a physical quantity is detected on the basis of the capacitance of the capacitor.

There are known capacitive physical-quantity detection apparatuses of various types which are designed to implement self diagnoses. In a self-diagnosis mode of operation of such a known apparatus, an electrostatic force is generated between a movable electrode and a fixed electrode to produce a state where a pseudo physical quantity is deemed to be acting on the movable electrode.

Self diagnosis is carried out by inspecting a response of an apparatus sensing portion to the pseudo physical quantity.

Japanese published unexamined patent application 5-322921 corresponding to U.S. Pat. No. 5,506,454 discloses a system for diagnosing characteristics of a capacitive acceleration sensor. In a diagnosis mode of operation of the system, a signal applicator serves as a means for applying a diagnosis signal to a fixed electrode so that a force corresponding to an acceleration is exerted onto a movable electrode. Diagnosis is carried out by inspecting a response of the sensor to the acceleration-corresponding force.

U.S. Pat. No. 5,540,095 discloses an accelerometer including two fixed electrodes opposed to a movable electrode. In a self-test mode of operation of the accelerometer, a carrier voltage level fed to one of the fixed electrodes is made different from a normal value to apply a pseudo physical quantity to the movable electrode. Self test is implemented by inspecting a response of an accelerometer sensing portion to the applied pseudo physical quantity.

U.S. Pat. No. 5,583,290 discloses a micromechanical sensing apparatus including two fixed electrodes opposed to a movable electrode. During a normal mode of operation of the apparatus, carrier signals having different center voltages are applied to the fixed electrodes respectively, and detection is made as to the capacitance of a capacitor formed by the fixed electrodes and the movable electrode. In a self-test mode of operation of the apparatus, a voltage fed to the movable electrode is made different from a normal value to apply a pseudo physical quantity to the movable electrode. Self test is implemented by inspecting a response of an apparatus sensing portion to the applied pseudo physical quantity.

SUMMARY OF THE INVENTION

It is an object of this invention to provide a capacitive physical-quantity detection apparatus which can implement self diagnosis in a new way.

A first aspect of this invention provides a capacitive physical-quantity detection apparatus comprising a movable electrode (2d) which is displaced in response to a physical quantity; a fixed electrode (3, 4) opposed to the movable electrode to form a capacitor in conjunction with the movable electrode; signal applying means (23, 24) for applying a first signal between the movable electrode and the fixed electrode, the first signal being periodic and having at least a first time period for detection of a capacity variation and a second time period for displacement of the movable electrode to implement self diagnosis; a C-V conversion circuit (21) for generating a voltage which depends on a variation in a capacitance of the capacitor during the first time period; a signal processing circuit (22) for processing the voltage generated by the C-V conversion circuit into a second signal depending on the physical quantity; and changing means (23) for changing the first signal in the second time period between a state for execution of self diagnosis and a state for unexecution of self diagnosis; wherein the first signal in the state for execution of self diagnosis applies a pseudo physical quantity to the movable electrode.

A second aspect of this invention is based on the first aspect thereof, and provides a capacitive physical-quantity detection apparatus wherein a frequency of the first signal is higher than a resonance frequency of the movable electrode in a direction of displacement of the movable electrode.

A third aspect of this invention is based on the first aspect thereof, and provides a capacitive physical-quantity detection apparatus wherein the changing means comprises means for changing a potential at the movable electrode.

A fourth aspect of this invention is based on the first aspect thereof, and provides a capacitive physical-quantity detection apparatus wherein the changing means comprises means for changing a potential at the fixed electrode.

A fifth aspect of this invention is based on the first aspect thereof, and provides a capacitive physical-quantity detection apparatus wherein the C-V conversion circuit comprises an operational amplifier (21a) having first and second input terminals, the first input terminal being connected to the movable electrode, and wherein the changing means comprises means for applying a first predetermined voltage (V/2) to the second input terminal during unexecution of self diagnosis, and means for applying a second predetermined voltage (V1) to the second input terminal during execution of self diagnosis.

A sixth aspect of this invention is based on the first aspect thereof, and provides a capacitive physical-quantity detection apparatus wherein the C-V conversion circuit comprises an operational amplifier (21a), and the changing means comprises means for connecting the movable electrode and an input terminal of the operational amplifier during unexecution of self diagnosis, and means for applying a predetermined voltage (V1) to the movable electrode during execution of self diagnosis.

A seventh aspect of this invention is based on the first aspect thereof, and provides a capacitive physical-quantity detection apparatus wherein the changing means comprises means for applying a periodic signal to the fixed electrode during unexecution of self diagnosis, and means for applying a predetermined voltage (V1) to the fixed electrode during execution of self diagnosis.

An eighth aspect of this invention provides a capacitive physical-quantity detection apparatus comprising a movable electrode (2d) which is displaced in response to a physical quantity; a fixed electrode (3, 4) opposed to the movable electrode to form a capacitor in conjunction with the movable electrode; signal applying means (24) for, during execution of self diagnosis, applying a first signal between the movable electrode and the fixed electrode, the first signal being periodic and having at least a first time period for detection of a capacity variation and a second time period for displacement of the movable electrode to implement self diagnosis, and for, during unexecution of self diagnosis, applying a second signal between the movable electrode and the fixed electrode, the second signal being periodic and having at least a third time period for detection of a capacity variation, the second signal being void of a time period for displacement of the movable electrode to implement self diagnosis; a C-V conversion circuit (21) for generating a voltage which depends on a variation in a capacitance of the capacitor during the first time period and the third time period; and a signal processing circuit (22) for processing the voltage generated by the C-V conversion circuit into a third signal depending on the physical quantity; wherein the signal applying means comprises means (23) for generating an electrostatic force between the movable electrode and the fixed electrode in response to the first signal in the second time period, and for applying a pseudo physical quantity to the movable electrode in response to the electrostatic force.

A ninth aspect of this invention is based on the first aspect thereof, and provides a capacitive physical-quantity detection apparatus wherein the first signal has a third time period for servo control, and there is provided means (25, 26) for feeding the second signal from the signal processing circuit to the movable electrode to hold the movable electrode at a predetermined position during the third time period.

A tenth aspect of this invention provides a capacitive physical-quantity detection apparatus comprising a movable electrode (2d) which is displaced in response to a physical quantity; a fixed electrode (3, 4) opposed to the movable electrode to form a capacitor in conjunction with the movable electrode; signal applying means (23, 24) for, during unexecution of self diagnosis, periodically applying a first signal between the movable electrode and the fixed electrode to detect a capacity variation, and for, during execution of self diagnosis, periodically applying the first signal between the movable electrode and the fixed electrode to detect a capacity variation and periodically applying a second signal between the movable electrode and the fixed electrode to displace the movable electrode to implement self diagnosis; a C-V conversion circuit (21) for generating a voltage which depends on a variation in a capacitance of the capacitor when the first signal is applied between the movable electrode and the fixed electrode to detect a capacity variation; a signal processing circuit (22) for processing the voltage generated by the C-V conversion circuit into a third signal depending on the physical quantity; wherein the second signal applies a pseudo physical quantity to the movable electrode.

An eleventh aspect of this invention is based on the first aspect thereof, and provides a capacitive physical-quantity detection apparatus wherein the fixed electrode comprises a pair of sub fixed electrodes, and the first signal in the first time period for detection of a capacity variation comprises a pair of carrier signals applied to the sub fixed electrodes respectively, the carrier signals having a same center voltage and a same amplitude, the carrier signals being inverse in voltage with respect to each other.

DESCRIPTION OF THE PREFERRED EMBODIMENTS

First Embodiment

Figure 1:
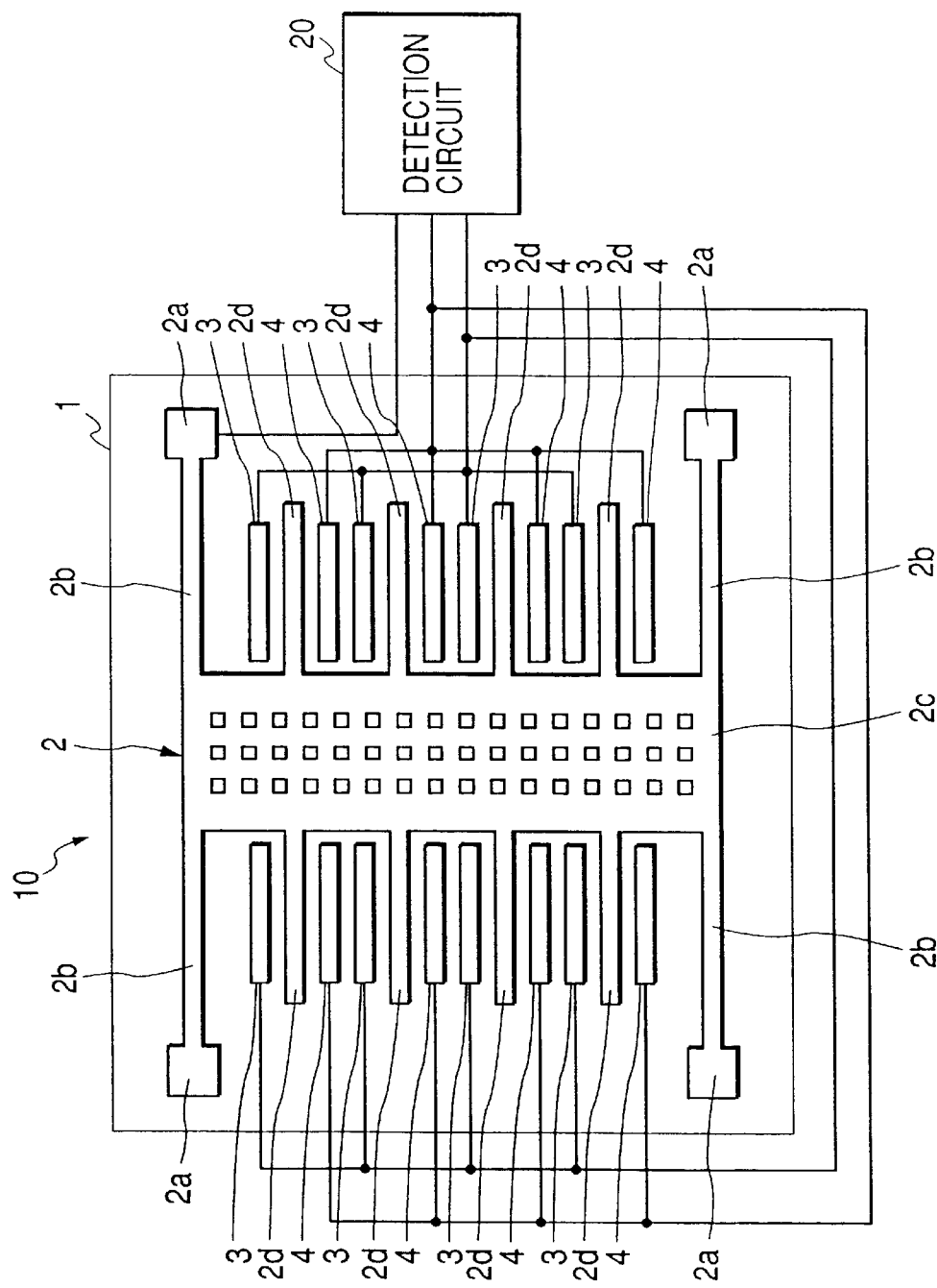
FIG. 1 is a diagram of a sensing portion of a capacitive acceleration sensor according to a first embodiment of this invention.

FIG. 1 shows a portion of a capacitive acceleration sensor according to a first embodiment of this invention. The capacitive acceleration sensor of FIG. 1 includes a sensor element 10 and a detection circuit 20.

The sensor element 10 has a structure including a beam arrangement 2. The beam arrangement 2 has four anchor portions 2a. A major portion of the beam arrangement 2 is connected to the upper surface of a substrate 1 via the anchor portions 2a. In addition, the beam arrangement 2 has four beam portions 2b, a mass portion 2c, and a plurality of movable electrodes 2d. The mass portion 2c is connected to the anchor portions 2a via the beam portions 2b respectively. The movable electrodes 2d are grouped into a first set and a second set. The movable electrodes 2d in the first set extend from one side of the mass portion 2c. The movable electrodes 2d in the second set extend from the other side of the mass portion 2c.

Fixed electrodes 3 and 4 are formed on the upper surface of the substrate 1. The fixed electrodes 3 alternate with the fixed electrodes 4. The fixed electrodes 3 and 4 are separated into pairs each having one fixed electrode and one fixed electrode. The pairs of the fixed electrodes 3 and 4 are assigned to the movable electrodes 2d respectively. Specifically, the fixed electrodes 3 and 4 in each pair are opposed to or face the related movable electrode 2d.

The mass portion 2c is displaced in response to an acceleration applied thereto. The movable electrodes 2d are displaced in accordance with displacement of the mass portion 2c. Accordingly, the movable electrodes 2d are displaced in response to the acceleration applied to the mass portion 2c.

The movable electrodes 2d and the fixed electrodes 3 and 4 are grouped into sets each having one movable electrode and two fixed electrodes. The movable electrode 2d and the fixed electrodes 3 and 4 in each set compose a differential capacitor arrangement formed by a pair of capacitors. In each set, the movable electrode 2d is located between the fixed electrodes 3 and 4. Normally, the movable electrode 2d is in its neutral position equidistant from the fixed electrodes 3 and 4. In each set, the capacitances of the two capacitors vary in opposite ways as the movable electrode 2d is displaced from its neutral position. Thus, in each set, the capacitances of the two capacitors differentially vary depending on the acceleration applied to the mass portion 2c.

The detection circuit 20 is electrically connected to the movable electrodes 2d via one of the anchor portions 2d, an associated one of the beam portions 2b, and the mass portion 2c. The detection circuit 20 is electrically connected to the fixed electrodes 3. In addition, the detection circuit 20 is electrically connected to the fixed electrodes 4. The detection circuit 20 operates to detect the acceleration applied to the mass portion 2c in response to variations in the differential capacitances of the differential capacitor arrangements formed by the movable electrodes 2d and the fixed electrodes 3 and 4.

Figure 2:
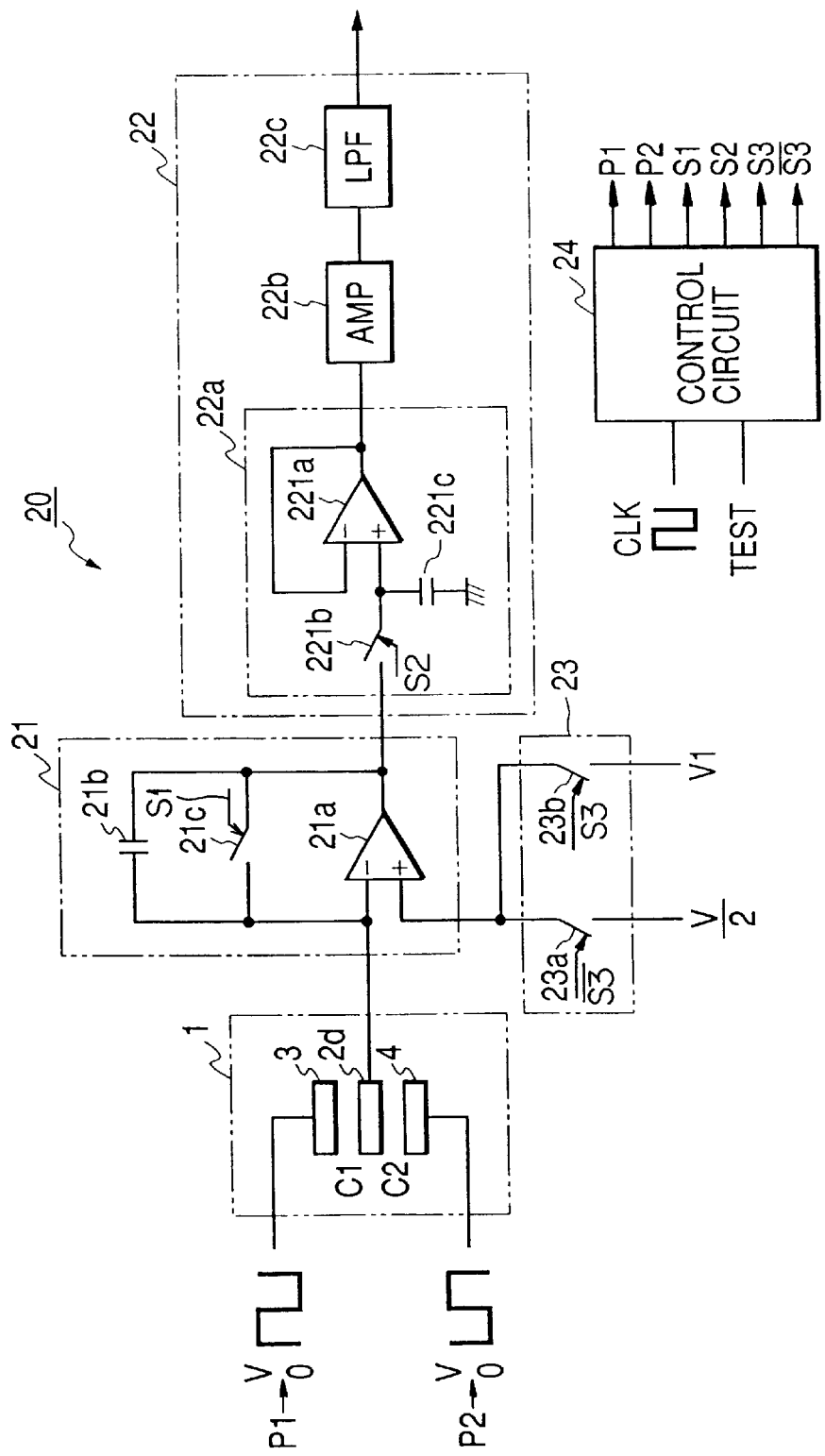
FIG. 2 is a diagram of a detection circuit in FIG. 1.

As shown in FIG. 2, the detection circuit 20 includes a C-V (capacitance-to-voltage) conversion circuit 21, a signal processing circuit 22, a switch circuit 23, and a control circuit 24. The switch circuit 23 and the control circuit 24 compose a device (a means) for periodically applying signals among the movable electrodes 2d and the fixed electrodes 3 and 4. The switch circuit 23 forms a device (a means) for changing a signal in a time interval for displacements of the movable electrodes 2d between a signal in execution of self diagnosis and a signal in unexecution of self diagnosis. Alternatively, the switch circuit 23 forms a device (a means) for setting a signal in a time interval for displacements of the movable electrodes 2d as a signal for generating electrostatic forces among the movable electrodes 2d and the fixed electrodes 3 and 4 to apply a pseudo physical quantity to the movable electrodes 2d.

The C-V conversion circuit 21 operates to convert variations in the differential capacitances of the differential capacitor arrangements into a corresponding voltage. As previously mentioned, the differential capacitor arrangements are formed by the movable electrodes 2d and the fixed electrodes 3 and 4. The C-V conversion circuit 21 includes an operational amplifier 21a, a capacitor 21b, and a switch 21c. The inverting input terminal of the operational amplifier 21a is connected to the movable electrodes 2d. The capacitor 21b is connected between the inverting input terminal of the operational amplifier 21a and the output terminal thereof. Also, the switch 21c is connected between the inverting input terminal of the operational amplifier 21a and the output terminal thereof. The noninverting input terminal of the operational amplifier 21a is connected to the switch circuit 23. The noninverting input terminal of the operational amplifier 21a selectively receives a predetermined voltage V/2 or a predetermined voltage V1 via the switch circuit 23. The voltage V/2 is equal to, for example, 2.5 volts. The voltage V1 differs from the voltage V2. The output terminal of the operational amplifier 21a leads to the output terminal of the C-V conversion circuit 21.

The signal processing circuit 22 follows the C-V conversion circuit 21. The signal processing circuit 22 includes a sample hold circuit 22a, an amplifier circuit (AMP) 22b, and a low pass filter (LPF) 22c. The input terminal of the sample hold circuit 22a is connected to the output terminal of the C-V conversion circuit 21. The sample hold circuit 22a is successively followed by the amplifier circuit 22b and the low pass filter 22c. The sample hold circuit 22a periodically samples the output signal (the voltage signal) of the C-V conversion circuit 21, and holds every sample for a given time interval and outputs the sample. The amplifier circuit 22b enlarges the output signal (the voltage signal) of the sample hold circuit 22a at a predetermined gain, and outputs the enlargement-resultant signal to the low pass filter 22c. The low pass filter 22c selects components of the output signal (the voltage signal) of the amplifier circuit 22b which have frequencies in a predetermined band. The low pass filter 22c outputs the selection-resultant signal as an acceleration detection signal, that is, a signal representing a detected acceleration.

The sample hold circuit 22a includes an operational amplifier 221a, a switch 221b, and a capacitor 221c. The operational amplifier 221a forms a voltage follower. The noninverting input terminal of the operational amplifier 221a is connected via the switch 221b to the output terminal of the C-V conversion circuit 21. The noninverting input terminal of the operational amplifier 221a is connected to one end of the capacitor 221c. The other end of the capacitor 221c is grounded. The inverting input terminal of the operational amplifier 221a is connected to the output terminal thereof. The output terminal of the operational amplifier 221a is connected to the input terminal of the amplifier circuit 22b.

The switch circuit 23 includes switches 23a and 23b connected to the noninverting input terminal of the operational amplifier 21a in the C-V conversion circuit 21. The switch 23a is connected to a source (not shown) for the voltage V/2. The switch 23b is connected to a source (not shown) for the voltage V1. When one of the switches 23a and 23b is open, the other switch is closed. Accordingly, the switch circuit 23 selectively applies the voltage V/2 or the voltage V1 to the noninverting input terminal of the operational amplifier 21a in the C-V conversion circuit 21.

The control circuit 24 receives a reference clock signal CLK and a self-diagnosis signal TEST from suitable devices (not shown). The self-diagnosis signal TEST means a signal representing whether or not self diagnosis is required. The control circuit 24 generates carrier signals P1 and P2, and switch control signals S1, S2, $\overline{S3}$ and S3 in response to the reference clock signal CLK and the self-diagnosis signal TEST. The switches 21c, 221b, 23a, and 23b include, for example, semiconductor switching elements having control terminals, respectively. The control circuit 24 is connected to the control terminals of the switches 21c, 221b, 23a, and 23b. The control circuit 24 is also connected to the fixed electrodes 3 and 4. The control circuit 24 outputs the carrier signal P1 to the fixed electrodes 3. The control circuit 24 outputs the carrier signal P2 to the fixed electrodes 4. The carrier signals P1 and P2 have rectangular waveforms respectively. The carrier signals P1 and P2 have a predetermined amplitude V corresponding to twice the voltage V/2. The carrier signals P1 and P2 are inverse in voltage with respect to each other. The amplitude V is equal to, for example, 5 volts. The carrier signals P1 and P2 have a predetermined frequency. The control circuit 24 outputs the control signals S1, S2, $\overline{S3}$ and S3 to the control terminals of the switches 21c, 221b, 23a, and 23b, respectively. The control signals S1, S2, $\overline{S3}$ and $\overline{S3}$ are binary. The control signal $\overline{S3}$ is an inversion of the control signal S3. The switch 21c is closed when the control signal S1 assumes its high level state, and is opened when the control signal S1 assumes its low level state. The switch 221b is closed when the control signal S2 assumes its high level state, and is opened when the control signal S2 assumes its low level state. The switch 23a is closed when the control signal $\overline{S3}$ assumes its high level state, and is opened when the control signal $\overline{S3}$ assumes its low level state. The switch 23b is closed when the control signal S3 assumes its high level state, and is opened when the control signal S3 assumes its low level state.

Figure 3:
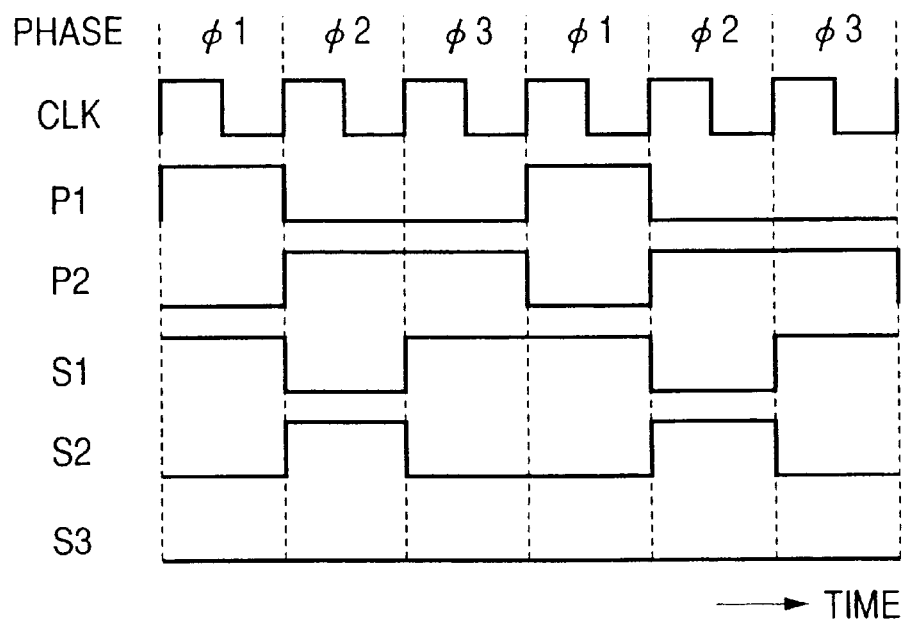
FIG. 3 is a time-domain diagram of various signals which occur during a normal mode of operation of the sensor in FIG. 1.
Figure 4:
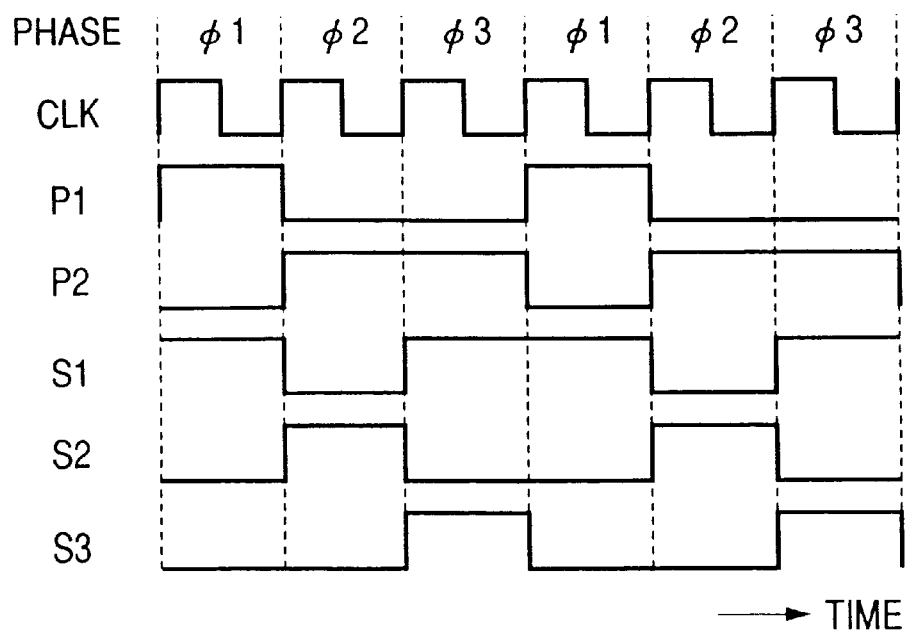
FIG. 4 is a time-domain diagram of various signals which occur during a self-diagnosis mode of operation of the sensor in FIG. 1.

Operation of the capacitive acceleration sensor in FIGS. 1 and 2 will be explained hereinafter with reference to FIGS. 3 and 4. The carrier signals P1 and P2 outputted from the control circuit 24 have rectangular waveforms. The carrier signals P1 and P2 have a predetermined amplitude V. Each of the carrier signals P1 and P2 alternates between a high level state and a low level state at a predetermined period corresponding to three periods ($\phi1$, $\phi2$, and $\phi3$) of the clock signal CLK. The carrier signal P2 is an inversion of the carrier signal P1. The control signals S1 and S2 have a period corresponding to three periods ($\phi1$, $\phi2$, and $\phi3$) of the clock signal CLK. Basically, the control signals $\overline{S3}$ and S3 have a period corresponding to three periods ($\phi1$, $\phi2$, and $\phi3$) of the clock signal CLK. The three successive periods (that is, the first, second, and third periods) $\phi1$, $\phi2$, and $\phi3$ of the clock signal CLK are also referred to as first, second, and third phases respectively. The first and second periods (the first and second phases) $\phi1$ and $\phi2$ are assigned to detection of variations in capacitances. The third period (the third phase) $\phi3$ is assigned to generation of forced displacements of the moving electrodes 2d.

Operation of the capacitive acceleration sensor in FIGS. 1 and 2 can be changed between a normal mode and a self-diagnosis mode in response to the self-diagnosis signal TEST. Specifically, the normal mode of operation of the sensor is implemented when the self-diagnosis signal TEST is in its inactive state (its low level state). The self-diagnosis mode of operation of the sensor is implemented when the self-diagnosis signal TEST is in its active state (its high level state).

First, the normal mode of operation of the sensor will be explained below with reference to FIG. 3. During the first period (the first phase) $\phi1$, the carrier signal P1 is in its high level state while the carrier signal P2 is in its low level state. The switch 21c is held closed by the control signal S1 in its high level state. In addition, the switch 221b is held open by the control signal S2 in its low level state. The control signal $\overline{S3}$ is in its high level state. The control signal S3 is in its low level state. Therefore, the switch 23a is held closed by the control signal $\overline{S3}$ while the switch 23b is held open by the control signal S3. Since the switch 23a remains closed, the voltage V/2 is applied to the noninverting input terminal of the operational amplifier 21a. Since the switch 21c remains closed, the operational amplifier 21a acts as a voltage follower so that the voltage V/2 appears at the output terminal of the operational amplifier 21a. The voltage V/2 is fed back to the inverting input terminal of the operational amplifier 21a, and is hence applied to the movable electrodes 2d. Therefore, the voltage of the movable electrodes 2d is clamped to the value V/2. In addition, the high-level carrier signal P1 causes a voltage V/2 to be applied to the movable electrodes 2d in the absence of an actual acceleration (in the absence of displacements of the movable electrodes 2d from their neutral positions). Since the switch 21c remains closed, the capacitor 21b is discharged.

During the first period (the first phase) $\phi1$, charges are stored between the movable electrodes 2d and the fixed electrodes 3. The stored charge amount Q1 is expressed as "Q1=−C1·V/2", where C1 denotes a resultant capacitance between the movable electrodes 2d and the fixed electrodes 3. The sign "−" in the previous equation means that negative charges are stored at surfaces of the movable electrodes 2d which face the fixed electrodes 3. In addition, charges are stored between the movable electrodes 2d and the fixed electrodes 4. The stored charge amount Q2 is expressed as "Q2=C2·V/2", where C2 denotes a resultant capacitance between the movable electrodes 2d and the fixed electrodes 4. The capacitances C1 and C2 are differential with respect to each other.

During the second period (the second phase) $\phi2$, the carrier signal P1 is in its low level state while the carrier signal P2 is in its high level state. The switch 21c is held open by the control signal S1 in its low level state. In addition, the switch 221b is held closed by the control signal S2 in its high level state. The control signal $\overline{S3}$ is in its high level state. The control signal S3 is in its low level state. Therefore, the switch 23a is held closed by the control signal $\overline{S3}$ while the switch 23b is held open by the control signal S3. Since the switch 23a remains closed, the voltage V/2 is applied to the noninverting input terminal of the operational amplifier 21a. The high-level carrier signal P2 causes a voltage V/2 to be applied to the movable electrodes 2d in the absence of an actual acceleration (in the absence of displacements of the movable electrodes 2d from their neutral positions). Since the switch 21c remains open, the capacitor 21b can be charged.

During the second period (the second phase) $\phi2$, charges are stored between the movable electrodes 2d and the fixed electrodes 3. The stored charge amount Q1' is expressed as "Q1'=C1·V/2". In addition, charges are stored between the movable electrodes 2d and the fixed electrodes 4. The stored charge amount Q2' is expressed as "Q2'=−C2·V/2".

The total amount of charges accumulating in the movable electrodes 2d during the first period $\phi1$ is given as "Q1+Q2". The total amount of charges accumulating in the movable electrodes 2d during the second period $\phi2$ is given as "Q1'+Q2'". The difference $\Delta Q$ between the total charge amounts is expressed as follows.

$$\Delta Q=(Q1+Q2)-(Q1'+Q2')=-(C1-C2)V$$

In the case where the differential capacitances are unequal due to the application of an actual acceleration to the movable electrodes 2d, charges corresponding to the difference $\Delta Q$ occur in the movable electrodes 2d at the end of the second period $\phi2$. Corresponding charges $\Delta Q$ accumulate in a side of the capacitor 21b which leads to the movable electrodes 2d. It should be noted that the capacitor 21b can be charged during the second period $\phi2$. Opposite-sign (opposite-polarity) charges $\Delta Q'$ accumulate in the other side of the capacitor 21b. The opposite-sign charges $\Delta Q'$ are expressed as "$\Delta Q'=(C1-C2)V$". As a result, the signal voltage "$\Delta Q'/Cf+V/2$" which is expressed below occurs at the output terminal of the operational amplifier 21a.

$$\Delta Q'/Cf+V/2=(C1-C2)V/Cf+V/2$$

where Cf denotes the capacitance of the capacitor 21b. Thus, the signal voltage which depends on the capacitance difference "C1−C2" appears at the output terminal of the operational amplifier 21a. The capacitance difference "C1−C2" depends on the applied actual acceleration, and hence the signal voltage represents the applied actual acceleration.

The sample hold circuit 22a receives the signal voltage from the C-V conversion circuit 21. The sample hold circuit 22a samples the signal voltage at the end of the second period $\phi2$, and then holds the resultant signal sample. The sample hold circuit 22a outputs the held signal sample to the amplifier circuit 22b. The signal sample is successively processed by the amplifier circuit 22b and the low pass filter 22c into an acceleration detection signal (a final signal representing the applied actual acceleration). The low pass filter 22c outputs the acceleration detection signal.

During the third period (the third phase) φ3, the carrier signal P1 is in its low level state while the carrier signal P2 is in its high level state. The switch 21c is held closed by the control signal S1 in its high level state. In addition, the switch 221b is held open by the control signal S2 in its low level state. The control signal $\overline{S3}$ is in its high level state. The control signal S3 is in its low level state. Therefore, the switch 23a is held closed by the control signal $\overline{S3}$ while the switch 23b is held open by the control signal S3. Since the switch 23a remains closed, the voltage V/2 is applied to the noninverting input terminal of the operational amplifier 21a. Since the switch 21c remains closed, the operational amplifier 21a acts as a voltage follower so that the voltage V/2 appears at the output terminal of the operational amplifier 21a. The voltage V/2 is fed back to the inverting input terminal of the operational amplifier 21a, and is hence applied to the movable electrodes 2d. Therefore, the voltage of the movable electrodes 2d is clamped to the value V/2. In addition, the high-level carrier signal P2 causes a voltage V/2 to be applied to the movable electrodes 2d in the absence of an actual acceleration (in the absence of displacements of the movable electrodes 2d from their neutral positions). Accordingly, there do not occur any electrostatic forces to displace the movable electrodes 2d from their neutral positions, and hence to generate a pseudo acceleration. Since the switch 21c remains closed, the capacitor 21b is discharged.

In the normal mode of operation of the sensor, the previously-mentioned processes in the first, second, and third periods φ1, φ2, and φ3 are iterated. When the movable electrodes 2d receive an actual acceleration and are displaced from their neutral positions accordingly, the signal processing circuit 22 (the low pass filter 22c in the signal processing circuit 22) outputs a corresponding acceleration detection signal, that is, a signal representing the actual acceleration.

The self-diagnosis mode of operation of the sensor will be explained below with reference to FIG. 4. During the first and second periods (the first and second phases) φ1 and φ2, the self-diagnosis mode of operation of the sensor is similar to the normal mode of operation thereof.

During the third period (the third phase) φ3, the carrier signal P1 is in its low level state while the carrier signal P2 is in its high level state. The switch 21c is held closed by the control signal S1 in its high level state. In addition, the switch 221b is held open by the control signal S2 in its slow level state. Furthermore, the control signal S3 is in its high level state while the control signal $\overline{S3}$ is in its low level state. Thus, the switch 23a is held open by the control signal $\overline{S3}$ while the switch 23b is held closed by the control signal S3. Since the switch 23b remains closed, the voltage V1 is applied to the noninverting input terminal of the operational amplifier 21a. Since the switch 21c remains closed, the operational amplifier 21a acts as a voltage follower so that the voltage V1 appears at the output terminal of the operational amplifier 21a. The voltage V1 is fed back to the inverting input terminal of the operational amplifier 21a, and is hence applied to the movable electrodes 2d so that the voltage of the movable electrodes 2d is clamped to the value V1. Thus, the potential of the movable electrodes 2d is equivalent to the voltage V1. Since the carrier signal P1 is in its low level state, the potential of the fixed electrodes 3 corresponds to "0". Accordingly, there occurs the potential difference "V1" between the movable electrodes 2d and the fixed electrodes 3. Since the carrier signal P2 is in its high level state, the potential of the fixed electrodes 4 is equivalent to the voltage V. Accordingly, there occurs the potential difference "V−V1" between the movable electrodes 2d and the fixed electrodes 4. In the case where the potential difference "V1" and the potential difference "V−V1" are unequal, the movable electrodes 2d are subjected to non-zero electrostatic forces so that they are displaced from their neutral positions. Thus, a pseudo acceleration is deemed to be acting on the movable electrodes 2d.

When the potential difference "V1" is greater than the potential difference "V−V1", the movable electrodes 2d are displaced from their neutral positions toward the fixed electrodes 3. When the potential difference "V1" is smaller than the potential difference "V−V1", the movable electrodes 2d are displaced from their neutral positions toward the fixed electrodes 4.

It is preferable that the frequency of the carrier signals P1 and P2 is significantly higher than (for example, equal to at least twice) a resonance frequency of the movable electrodes 2d in the direction of detection. In this case, a DC-like pseudo acceleration (a substantially constant pseudo acceleration) is deemed to be acting on the movable electrodes 2d, and the movable electrodes 2d remains displaced from their neutral positions during the next first and second periods φ1 and φ2. Self-diagnosis can be implemented by detecting a capacitance variation caused by the DC-like pseudo acceleration. The detection of the capacitance variation is executed at the end of the next second period φ2.

In the case where the movable electrodes 2d are normally displaced by the pseudo acceleration, the capacitances C1 and C2 change to the values C1' and C2' respectively so that the output voltage of the C-V conversion circuit 21 changes to the value "V/2+(C1'−C2')V/Cf". The output voltage of the signal processing circuit 22 varies accordingly. To detect this variation in the output voltage of the signal processing circuit 22 by referring to a reference, it is possible to diagnose or determine whether the sensor is normal or wrong. For example, in the case where the movable electrodes 2d are stuck by dust and hence fail to move in response to the pseudo acceleration, the capacitances do not vary so that the output voltage of the signal processing circuit 22 remains unchanged. To detect the unchanged voltage, it is possible to diagnose or determine that the sensor is wrong. In the case where the sensitivity of the sensor changes as the sensor ages, the pseudo-acceleration-caused variation in the output voltage of the signal processing circuit 22 reflects the sensitivity change. Accordingly, it is possible to detect the sensitivity change by measuring the pseudo-acceleration-caused variation in the output voltage of the signal processing circuit 22.

In the embodiment of this invention, the carrier signals P1 and P2 have the same amplitude V (for example, 5 volts), and the center voltages thereof are equal to the same value V/2 (for example, 2.5 volts). The carrier signal P2 is an inverse of the carrier signal P1. In U.S. Pat. No. 5,583,290, the center voltages of two carrier signals are different from each other, and resistors and capacitors are required to make different the center voltages. On the other hand, in the embodiment of this invention, the circuit (the control circuit 24) for generating the carrier signals P1 and P2 can be formed by a simple arrangement including an inverter since the carrier signals P1 and P2 have the same amplitude V and are inverse with respect to each other, and the center voltages thereof are equal to the same value V/2.

According to the embodiment of this invention, in the execution of self diagnosis, the voltage V1 is applied to the movable electrodes 2d during the third period φ3, and the voltage applied to the movable electrodes 2d is returned to the value V/2 and the capacitance detection is implemented during the first and second periods φ1 and φ2. Parasitic capacitances caused by wiring lines between the movable electrodes 2d and the operational amplifier 21a would result in an error in the output signal of the C-V 25 conversion circuit 21. According to the embodiment of this invention, since the voltage applied to the movable electrodes 2d is returned to the value V/2 during the execution of the capacitance detection, it is possible to decrease or suppress the above-indicated error in the output signal of the C-V conversion circuit 21.

The control circuit 24 includes counters responsive to the clock signal CLK. The carrier signals P1 and P2, and the control signals S1, S2, $\overline{S3}$ and S3 are generated in response to the output signals of the counters.

Second Embodiment

Figure 5:
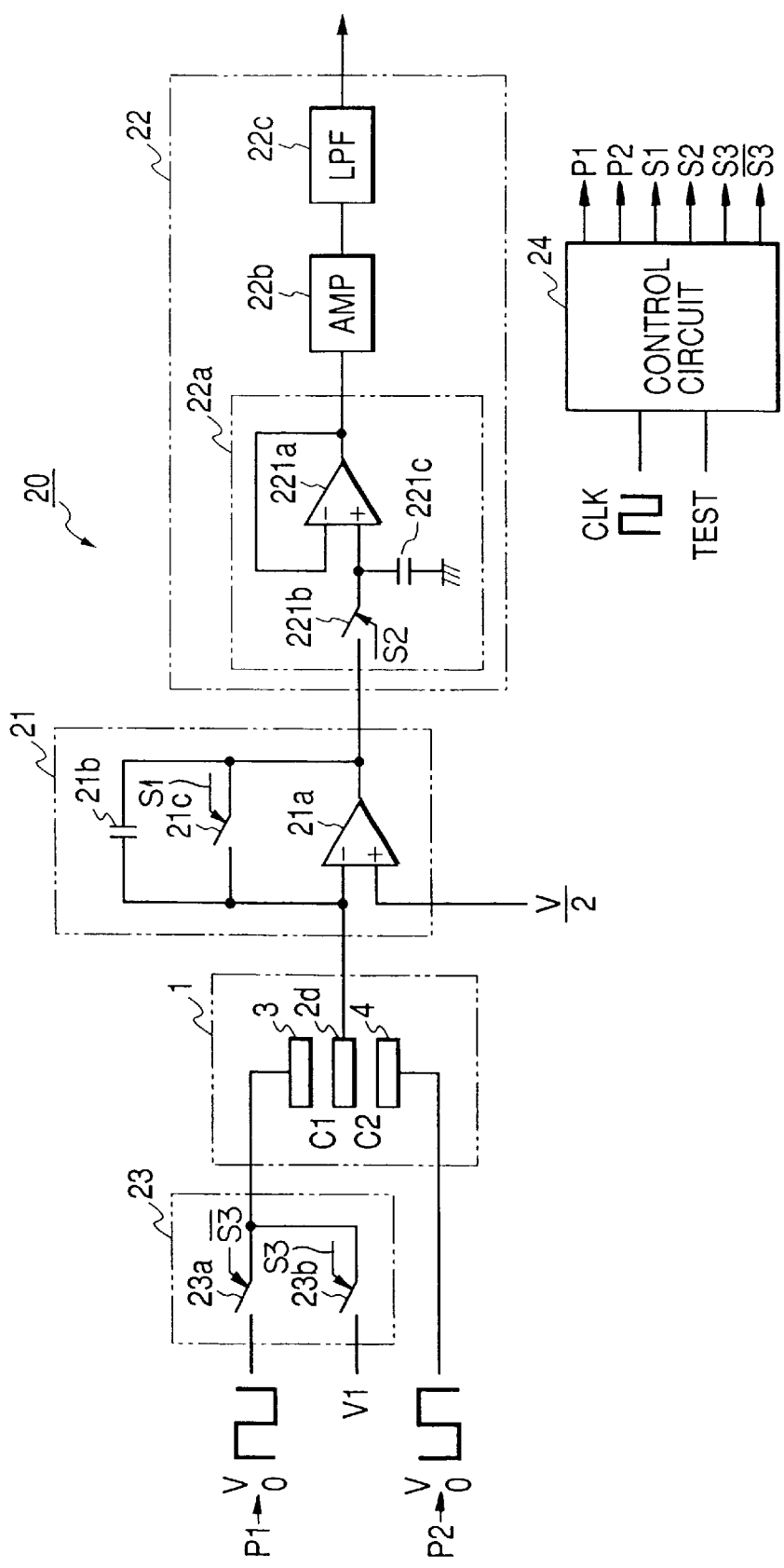
FIG. 5 is a diagram of a detection circuit in a capacitive acceleration sensor according to a second embodiment of this invention.

FIG. 5 shows a portion of a capacitive acceleration sensor according to a second embodiment of this invention. The sensor of FIG. 5 is similar to the sensor in FIGS. 1 and 2 except for design changes indicated below. In the sensor of FIG. 5, the noninverting input terminal of the operational amplifier 21a in the C-V conversion circuit 21 is continuously subjected to the voltage V/2. In addition, the switch circuit 23 is provided between the control circuit 24 and the fixed electrodes 3. Specifically, the switch 23a in the switch circuit 23 is connected between the control circuit 24 and the fixed electrodes 3. The switch 23b in the switch circuit 23 is connected between the source (not shown) for the voltage V1 and the fixed electrodes 3.

In the normal mode of operation of the sensor, the switches 23a and 23b continue to be closed and open respectively so that the carrier signal P1 remains applied to the fixed electrodes 3. In the self-diagnosis mode of operation of the sensor, only during the third period φ3, the switch 23a is open and the switch 23b is closed so that the voltage V1 is applied to the fixed electrodes 3. In this case, there occurs the potential difference "V/2–V1" between the movable electrodes 2d and the fixed electrodes 3 while there occurs the potential difference "V/2" between the movable electrodes 2d and the fixed electrodes 4. It should be noted that during the third period φ3, the voltage of the movable electrodes 2d is clamped to the value V/2 via the operational amplifier 21a in the C-V conversion circuit 21. The unequal potential differences apply non-zero electrostatic forces to the movable electrodes 2d so that they are displaced from their neutral positions. Thus, a pseudo acceleration is deemed to be acting on the movable electrodes 2d. In addition, it Is possible to implement self diagnosis as in the first embodiment of this invention.

Third Embodiment

Figure 6:
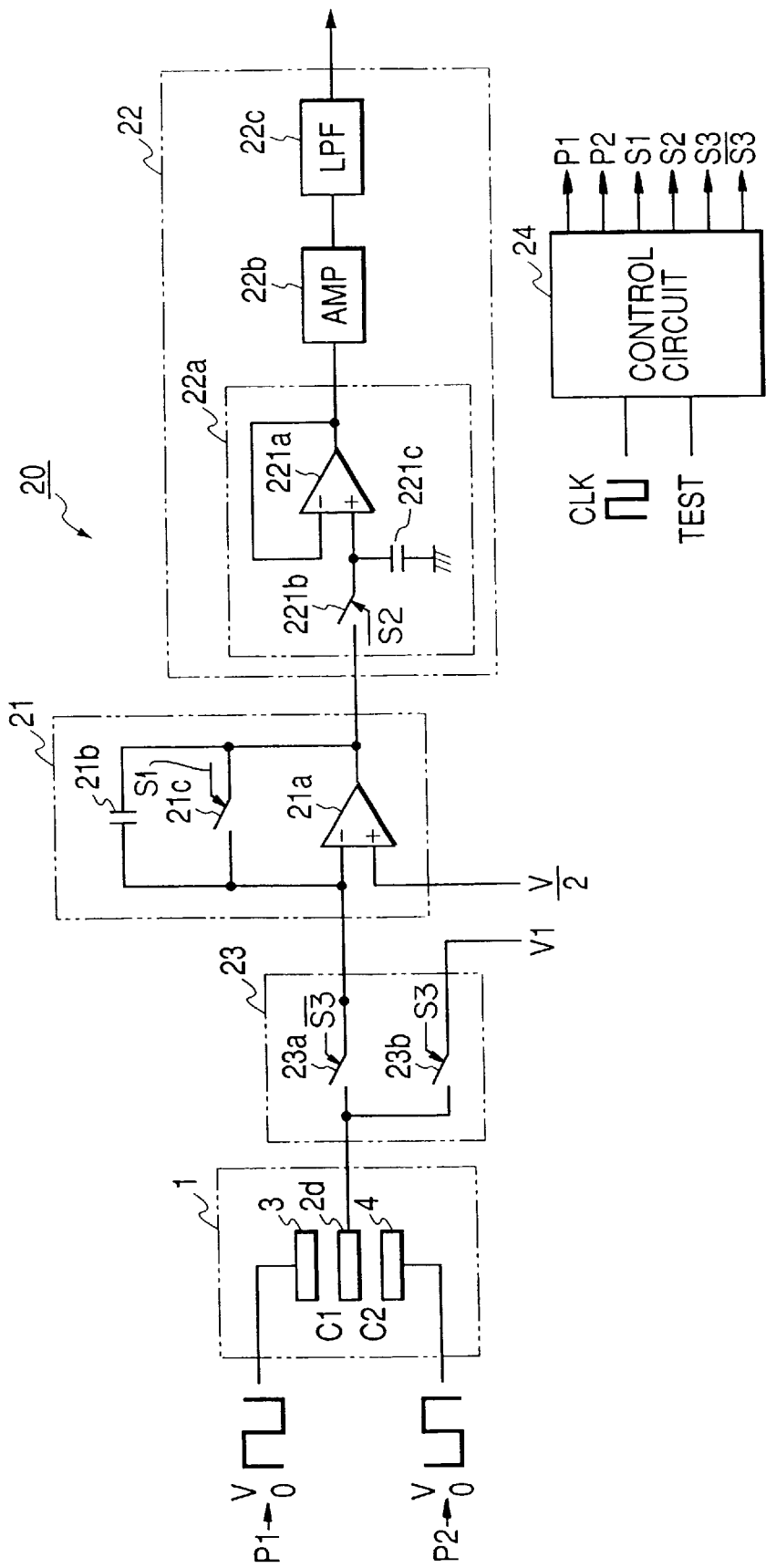
FIG. 6 is a diagram of a detection circuit in a capacitive acceleration sensor according to a third embodiment of this invention.

FIG. 6 shows a portion of a capacitive acceleration sensor according to a third embodiment of this invention. The sensor of FIG. 6 is similar to the sensor in FIGS. 1 and 2 except for design changes indicated below. In the sensor of FIG. 6, the noninverting input terminal of the operational amplifier 21a in the C-V conversion circuit 21 is continuously subjected to the voltage V/2. In addition, the switch circuit 23 is provided between the C-V conversion circuit 21 and the movable electrodes 2d. Specifically, the switch 23a in the switch circuit 23 is connected between the inverting input terminal of the operational amplifier 21a and the movable electrodes 2d. The switch 23b in the switch circuit 23 is connected between the source (not shown) for the voltage V1 and the movable electrodes 2d.

In the normal mode of operation of the sensor, the switches 23a and 23b continue to be closed and open respectively so that the movable electrodes 2d remain connected to the operational amplifier 21a in the C-V conversion circuit 21. In the self-diagnosis mode of operation of the sensor, only during the third period φ3, the switch 23a is open and the switch 23b is closed so that the voltage V1 is applied to the movable electrodes 2d. In this case, a pseudo acceleration is deemed to be acting on the movable electrodes 2d. Thus, it is possible to implement self diagnosis as in the first embodiment of this invention.

Fourth Embodiment

Figure 7:
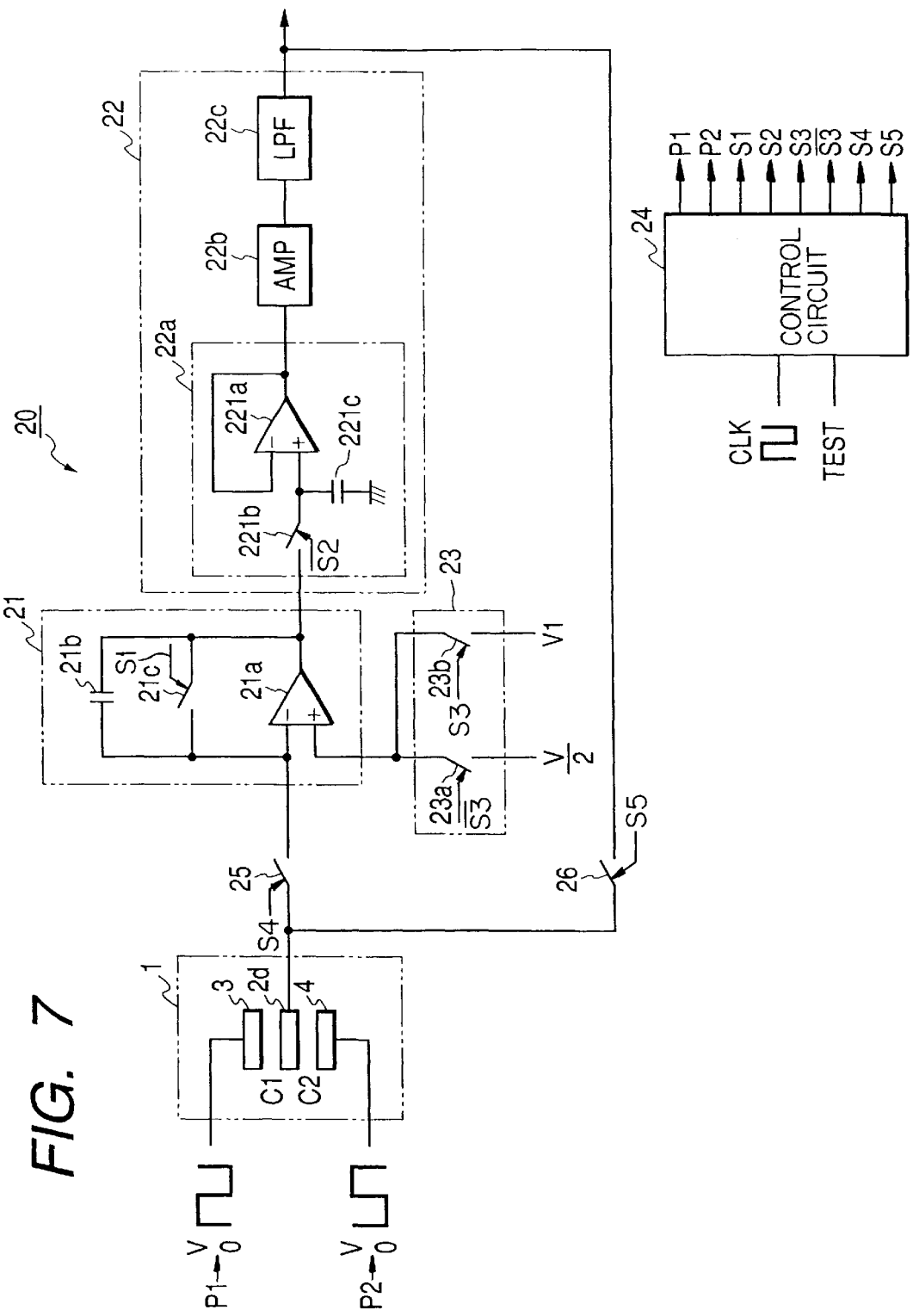
FIG. 7 is a diagram of a detection circuit in a capacitive acceleration sensor according to a fourth embodiment of this invention.

FIG. 7 shows a portion of a capacitive acceleration sensor according to a fourth embodiment of this invention. The sensor of FIG. 7 is similar to the sensor in FIGS. 1 and 2 except for design changes indicated below. The sensor of FIG. 7 has a servo control function.

The sensor of FIG. 7 includes switches 25 and 26. The switch 25 is connected between the movable electrodes 2d and the inverting input terminal of the operational amplifier 21a in the C-V conversion circuit 21. The switch 26 is connected between the output terminal of the signal processing circuit 22 (that is, the output terminal of the low pass filter 22c) and the movable electrodes 2d. Accordingly, the output voltage of the signal processing circuit 22 can be fed back to the movable electrodes 2d.

The control circuit 24 generates switch control signals S4 and S5 in response to the reference clock signal CLK and the self-diagnosis signal TEST. The switches 25 and 26 include, for example, semiconductor switching elements having control terminals, respectively. The control circuit 24 is connected to the control terminals of the switches 25 and 26. The control circuit 24 outputs the control signals S4 and S5 to the control terminals of the switches 25 and 26, respectively. The control signals S4 and S5 are binary. The switch 25 is closed when the control signal S4 assumes its high level state, and is opened when the control signal S4 assumes its low level state. The switch 26 is closed when the control signal S5 assumes its high level state, and is opened when the control signal S5 assumes its low level state.

Figure 8:
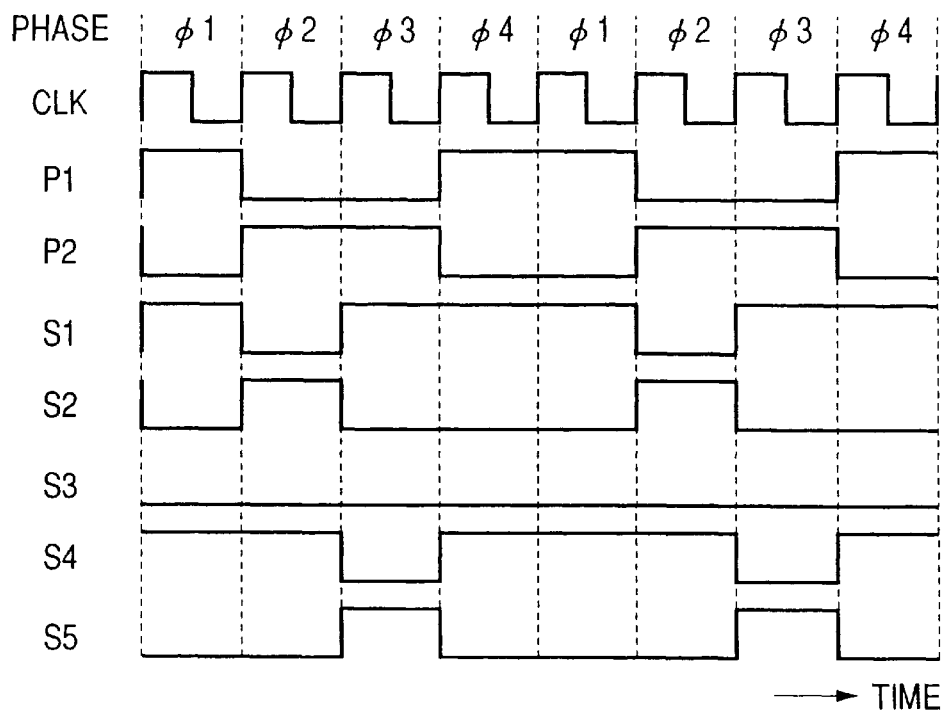
FIG. 8 is a time-domain diagram of various signals which occur during a normal mode of operation of the sensor in FIG. 7.
Figure 9:
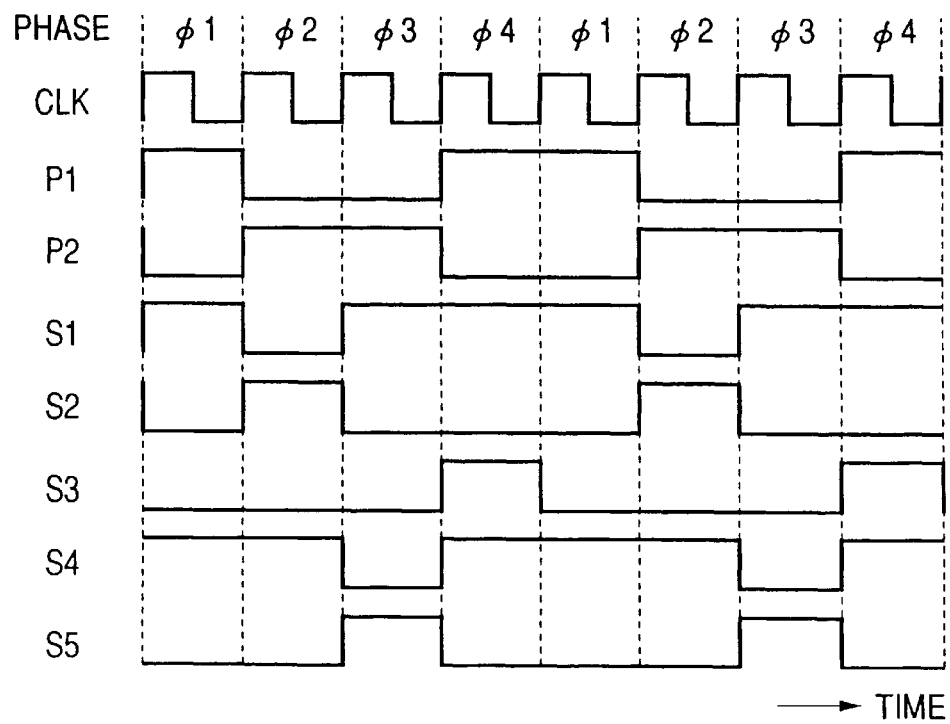
FIG. 9 is a time-domain diagram of various signals which occur during a self-diagnosis mode of operation of the sensor in FIG. 7.

Operation of the capacitive acceleration sensor in FIG. 7 will be explained hereinafter with reference to FIGS. 8 and 9. The carrier signals P1 and P2 outputted from the control circuit 24 have rectangular waveforms. The carrier signals P1 and P2 have a predetermined amplitude V. Each of the carrier signals P1 and P2 alternates between a high level state and a low level state at a predetermined period corresponding to four periods (φ1, φ2, φ3, and φ4) of the clock signal CLK. The carrier signal P2 is an inversion of the carrier signal P1. The control signals S1, S2, S4, and S5 have a period corresponding to four periods (φ1, φ2, φ3, and φ4) of the clock signal CLK. Basically, the control signals $\overline{S3}$ and S3 have a period corresponding to four periods (φ1, φ2, φ3, and φ4) of the clock signal CLK. The four successive periods (that is, the first, second, third, and fourth periods) φ1, φ2, φ3, and φ4 of the clock signal CLK are also referred to as first, second, third, and fourth phases respectively. The first and second periods (the first and second phases) φ1 and φ2 are assigned to detection of variations in capacitances. The third period (the third phase) φ3 is assigned to servo control. The fourth period (the third phase) φ4 is assigned to generation of forced displacements of the moving electrodes 2d.

Operation of the capacitive acceleration sensor in FIG. 7 can be changed between a normal mode and a self-diagnosis mode in response to the self-diagnosis signal TEST. Specifically, the normal mode of operation of the sensor is implemented when the self-diagnosis signal TEST is in its inactive state (its low level state). The self-diagnosis mode of operation of the sensor is implemented when the self-diagnosis signal TEST is in its active state (its high level state).

First, the normal mode of operation of the sensor will be explained below with reference to FIG. 8. During the first and second periods (the first and second phases) φ1 and φ2, the switch is held closed by the control signal S4 in its high level state while the switch 26 is held open by the control signal S5 in its low level state. The sensor of FIG. 7 operates similarly to the sensor in the first embodiment of this invention.

During the third period (the third phase) φ3, the switch 25 is held open by the control signal S4 in its low level state while the switch 26 is held closed by the control signal S5 in its high level state. Therefore, the output voltage of the signal processing circuit 22 is applied to the movable electrodes 2d in a servo control basis. The amplifier circuit 22 determines the magnitude of the output voltage of the signal processing circuit 22. The amplifier circuit 22 operates to displace the movable electrodes 2d in directions opposite to acceleration-corresponding directions, and to then hold the movable electrodes 2d at predetermined positions. In this way, the movable electrodes 2d are held at the predetermined positions on a servo control basis.

During the fourth period (the fourth phase) φ4, the switch 25 is held closed by the control signal S4 in its high level state while the switch 26 is held open by the control signal S5 in its low level state. The sensor of FIG. 7 operates similarly to operation of the sensor in the first embodiment of this invention during the first period (the first phase) φ1.

In the normal mode of operation of the sensor, the previously-mentioned processes in the first, second, third, and fourth periods φ1, φ2, φ3, and φ4 are iterated. When the movable electrodes 2d receive an actual acceleration and are displaced from their neutral positions accordingly, the signal processing circuit 22 (the low pass filter 22c in the signal processing circuit 22) outputs a corresponding acceleration detection signal, that is, a signal representing the actual acceleration.

The self-diagnosis mode of operation of the sensor will be explained below with reference to FIG. 9. During the first, second, and third periods (the first, second, and third phases) φ1, φ2, and φ3, the self-diagnosis mode of operation of the sensor is similar to the normal mode of operation thereof.

During the fourth period (the fourth phase) φ4, the switch 25 is held closed by the control signal S4 in its high level state while the switch 26 is held open by the control signal S5 in its low level state. The carrier signal P1 is in its high level state while the carrier signal P2 is in its low level state. The switch 21c is held closed by the control signal S1 in its high level state. In addition, the switch 221b is held open by the control signal S2 in its low level state. Furthermore, the control signal S3 is in its high level state while the control signal $\overline{S3}$ is in its low level state. Thus, the switch 23a is held open by the control signal $\overline{S3}$ while the switch 23b is held closed by the control signal S3. Since the switch 23b remains closed, the voltage V1 is applied to the noninverting input terminal of the operational amplifier 21a. Since the switch 21c remains closed, the operational amplifier 21a acts as a voltage follower so that the voltage V1 appears at the output terminal of the operational amplifier 21a. The voltage V1 is fed back to the inverting input terminal of the operational amplifier 21a, and is hence applied to the movable electrodes 2d so that the voltage of the movable electrodes 2d is clamped to the value V1. Thus, the potential of the movable electrodes 2d is equivalent to the voltage V1. Since the carrier signal P1 is in its high level state, the potential of the fixed electrodes 3 is equivalent to the voltage V. Accordingly, there occurs the potential difference "V–V1" between the movable electrodes 2d and the fixed electrodes 3. Since the carrier signal P2 is in its low level state, the potential of the fixed electrodes 4 corresponds to "0". Accordingly, there occurs the potential difference "V1" between the movable electrodes 2d and the fixed electrodes 4. In the case where the potential difference "V1" and the potential difference "V–V1" are unequal, the movable electrodes 2d are subjected to non-zero electrostatic forces so that they are displaced from their neutral positions. Thus, a pseudo acceleration is deemed to be acting on the movable electrodes 2d. In this way, the pseudo acceleration is applied to the movable electrodes 2d as in the third period φ3 regarding the first embodiment of this invention. Accordingly, it is possible to implement self diagnosis as in the first embodiment of this invention.

It should be noted that the switch circuit 23 may be located at a position corresponding to its position used in the second embodiment or the third embodiment of this invention.

The control circuit 24 includes counters responsive to the clock signal CLK. The carrier signals P1 and P2, and the control signals S1, S2, $\overline{S3}$, S3, S4, and S5 are generated in response to the output signals of the counters.

Fifth Embodiment

A fifth embodiment of this invention is similar to one of the first, second, and third embodiments thereof except for design changes indicated below.

Figure 10:
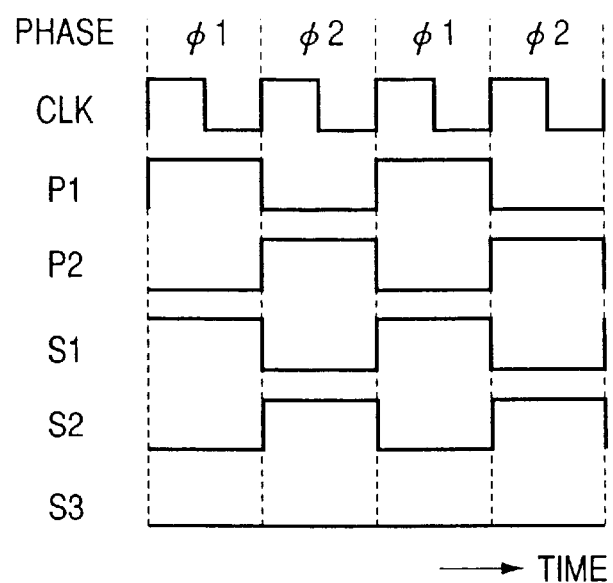
FIG. 10 is a time-domain diagram of various signals which occur during a normal mode of operation of a capacitive acceleration sensor according to a fifth embodiment of this invention.

With reference to FIG. 10, in a normal mode of operation of the fifth embodiment, each of the carrier signals P1 and P2 alternates between a high level state and a low level state at a predetermined period corresponding to two periods (φ1 and φ2) of the clock signal CLK. The carrier signal P2 is an inversion of the carrier signal P1. The control signals S1 and S2 have a period corresponding to two periods (φ1 and φ2) of the clock signal CLK. The control signal S3 remains in its low level state while the control signals $\overline{S3}$ remains in its high level state. The two successive periods (that is, the first and second periods) φ1 and φ2 of the clock signal CLK are also referred to as first and second phases respectively. During the first and second periods (the first and second phases) φ1 and φ2, the fifth embodiment of this invention operates similarly to the first, second, or third embodiment of this invention.

A self-diagnosis mode of operation of the fifth embodiment is similar to that of the first, second, or third embodiment of this invention.

As understood from the previous explanation, the processes implemented during the third period φ3 in the first, second, or third embodiment are omitted from the normal mode of operation of the fifth embodiment. Therefore, the frequency of the output signal of the C-V conversion circuit 21 can be increased, and the detection sensitivity can be enhanced. In the case where the frequency of the output signal of the C-V conversion circuit 21 is relatively high, the low pass filter 22c can effectively remove noise from the signal voltage even when the low pass filter 22c has a broad filtering characteristic. Thus, the setting of the low pass filter 22c is easy.

Sixth Embodiment

A sixth embodiment of this invention is similar to the fourth embodiment thereof except for design changes indicated below.

Figure 11:
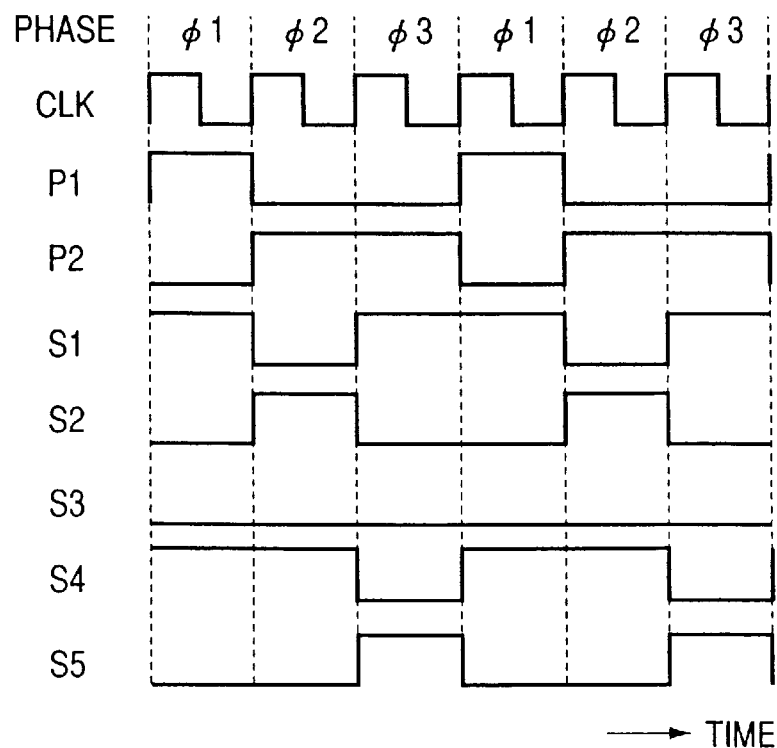
FIG. 11 is a time-domain diagram of various signals which occur during a normal mode of operation of a capacitive acceleration sensor according to a sixth embodiment of this invention.

With reference to FIG. 11, the processes implemented during the fourth period φ4 in the fourth embodiment are omitted from the normal mode of operation of the sixth embodiment.

Seventh Embodiment

According to a seventh embodiment of this invention, the acceleration sensor of one of the first, second, third, fourth, fifth, and sixth embodiments thereof is modified into another physical-quantity sensor such as a pressure sensor or a yaw rate sensor.

What is claimed is:

1. A capacitive physical-quantity detection apparatus comprising:

a movable electrode which is displaced in response to a physical quantity;

a fixed electrode opposed to the movable electrode to form a capacitor in conjunction with the movable electrode;

signal applying means for applying a first signal between the movable electrode and the fixed electrode, the first signal being periodic and having at least a first time period corresponding to a normal-operation time period for detection of a capacity variation and a second time period for displacement of the movable electrode to implement self diagnosis;

a C-V conversion circuit for generating a voltage which depends on a variation in a capacitance of the capacitor during the first time period the C-V conversion circuit including a switch for discharging the capacitor to implement a resetting process;

a signal processing circuit for processing the voltage generated by the C-V conversion circuit into a second signal depending on the physical quantity; and changing means for changing the first signal in the second time period between a state for execution of self diagnosis and a state for unexecution of self diagnosis;

wherein the first signal in the state for execution of self diagnosis applies a pseudo physical quantity to the movable electrode, and the changing means includes means for changing a potential at the movable electrode, and wherein the signal applying means includes means for, during execution of self diagnosis, subjecting the fixed electrode to a potential equal to that applied to the fixed electrode for the normal-operation time period.

2. A capacitive physical-quantity detection apparatus as recited in claim 1, wherein a frequency of the first signal is higher than a resonance frequency of the movable electrode in a direction of displacement of the movable electrode.

3. A capacitive physical-quantity detection apparatus as recited in claim 1, wherein the changing means comprises means for changing a potential at the movable electrode.

4. A capacitive physical-quantity detection apparatus as recited in claim 1, wherein the C-V conversion circuit comprises an operational amplifier (21a) having first and second input terminals, the first input terminal being connected to the movable electrode, and wherein the changing means comprises means for applying a first predetermined voltage (V/2) to the second input terminal during unexecution of self diagnosis, and means for applying a second predetermined voltage (V1) to the second input terminal during execution of self diagnosis.

5. A capacitive physical-quantity detection apparatus as recited in claim 1, wherein the C-V conversion circuit comprises an operational amplifier (21a), and the changing means comprises means for connecting the movable electrode and an input terminal of the operational amplifier during unexecution of self diagnosis, and means for applying a predetermined voltage (V1) to the movable electrode during execution of self diagnosis.

6. A capacitive physical-quantity detection apparatus as recited in claim 1, wherein the first signal has a third time period for servo control, and there is provided means (25, 26) for feeding the second signal from the signal processing circuit to the movable electrode to hold the movable electrode at a predetermined position during the third time period.

7. A capacitive physical-quantity detection apparatus comprising:

a movable electrode which is displaced in response to a physical quantity;

a fixed electrode opposed to the movable electrode to form a capacitor in conjunction with the movable electrode;

signal applying means for applying a first signal between the movable electrode and the fixed electrode, the first signal being periodic and having at least a first time period for detection of a capacity variation and a second time period for displacement of the movable electrode to implement self diagnosis;

a C-V conversion circuit for generating a voltage which depends on a variation in a capacitance of the capacitor during the first time period, the C-V conversion circuit including an amplifying circuit having first and second input terminals, the first input terminal being connected to the movable electrode, the C-V conversion circuit including a switch for discharging the capacitor to implement a resetting process;

reference applying means for applying a reference voltage to the second input terminal of the amplifying circuit;

a signal processing circuit for processing the voltage generated by the C-V conversion circuit into a second signal depending on the physical quantity; and changing means for changing the first signal in the second time period between a state for execution of self diagnosis and a state for unexecution of self diagnosis;

wherein the first signal in the state for execution of self diagnosis applies a pseudo physical quantity to the movable electrode, and the changing means includes means for changing the reference voltage applied to the second input terminal of the amplifying circuit and thereby changing a potential at the movable electrode.

8. A capacitive physical-quantity detection apparatus as recited in claim 7, wherein the amplifying circuit includes an operational amplifier connected to the first and second input terminals, and a feedback path connected between an output terminal of the operational amplifier and the first input terminal of the amplifying circuit, the feedback path enabling the potential at the movable electrode to be changed in accordance with change of the reference voltage applied to the second input terminal of the amplifying circuit.

9. A capacitive physical-quantity detection apparatus as recited in claim 7, wherein the fixed electrode includes an electrode of a first type and an electrode of a second type which are opposed to the movable electrode, and the signal applying means includes means for applying different voltages to the electrode of the first type and the electrode of the second type respectively, wherein the reference applying means includes means for applying a first predetermined voltage to the second input terminal of the amplifying circuit as the reference voltage during a normal-operation time period corresponding to the first time period, the first predetermined voltage being equal to a voltage intermediate between the different voltages applied to the electrode of the first type and the electrode of the second type, and wherein the changing means includes means for setting the reference voltage equal to the first predetermined voltage during unexecution of self diagnosis, and means for setting the reference voltage to a second predetermined voltage during execution of self diagnosis, the second predetermined voltage differing from the first predetermined voltage.

10. A capacitive physical-quantity detection apparatus as recited in claim 7, wherein a frequency of the first signal is higher than a resonance frequency of the movable electrode in a direction of displacement of the movable electrode.

11. A capacitive physical-quantity detection apparatus as recited in claim 7, wherein the amplifying circuit includes an operational amplifier, and the changing means includes means for connecting the movable electrode and an input terminal of the operational amplifier during unexecution of self diagnosis, and means for applying a predetermined voltage to the movable electrode during execution of self diagnosis.

12. A capacitive physical-quantity detection apparatus as recited in claim 7, wherein the first signal has a third time period for servo control, and there is provided means for feeding the second signal from the signal processing circuit to the movable electrode to hold the movable electrode at a predetermined position during the third time period.

13. A capacitive physical-quantity detection apparatus as recited in claim 9, wherein the first signal has a third time period for servo control, and there is provided means for feeding the second signal from the signal processing circuit to the movable electrode to hold the movable electrode at a predetermined position during the third time period.

14. A capacitive physical-quantity detection apparatus comprising:
  a movable electrode which is displaced in response to a physical quantity;
  a fixed electrode opposed to the movable electrode to form a capacitor in conjunction with the movable electrode;
  signal applying means for applying a first signal between the movable electrode and the fixed electrode, the first signal being periodic and having at least a first time period for detection of a capacity variation and a second time period for displacement of the movable electrode to implement self diagnosis;
  a C-V conversion circuit for generating a voltage which depends on a variation in a capacitance of the capacitor during the first time period, the C-V conversion circuit including a switch for discharging the capacitor to implement a resetting process;
  a signal processing circuit for processing the voltage generated by the C-V conversion circuit into a second signal depending on the physical quantity; and
  changing means for changing the first signal in the second time period between a state for execution of self diagnosis and a state for unexecution of self diagnosis;
  wherein the first signal in the state for execution of self diagnosis applies a pseudo physical quantity to the movable electrode, and the movable electrode and the C-V conversion circuit remain electrically connected with each other during execution of self diagnosis.

15. A capacitive physical-quantity detection apparatus as recited in claim 14, wherein a frequency of the first signal is higher than a resonance frequency of the movable electrode in a direction of displacement of the movable electrode.

16. A capacitive physical-quantity detection apparatus as recited in claim 14, wherein the C-V conversion circuit includes an operational amplifier having first and second input terminals, the first input terminal being connected to the movable electrode, and wherein the changing means includes means for applying a first predetermined voltage to the second input terminal during unexecution of self diagnosis, and means for applying a second predetermined voltage to the second input terminal during execution of self diagnosis.

17. A capacitive physical-quantity detection apparatus as recited in claim 14, wherein the C-V conversion circuit includes an operational amplifier, and the changing means includes means for connecting the movable electrode and an input terminal of the operational amplifier during unexecution of self diagnosis, and means for applying a predetermined voltage to the movable electrode during execution of self diagnosis.

18. A capacitive physical-quantity detection apparatus as recited in claim 14, wherein the changing means includes means for applying a periodic signal to the fixed electrode during unexecution of self diagnosis, and means for applying a predetermined voltage to the fixed electrode during execution of self diagnosis.

19. A capacitive physical-quantity detection apparatus as recited in claim 14, wherein the first signal has a third time period for servo control, and there is provided means for feeding the second signal from the signal processing circuit to the movable electrode to hold the movable electrode at a predetermined position during the third time period.

20. A capacitive physical-quantity detection apparatus comprising:
  a movable electrode which is displaced in response to a physical quantity;
  a fixed electrode opposed to the movable electrode to form a capacitor in conjunction with the movable electrode;
  signal applying means for applying a first signal between the movable electrode and the fixed electrode, the first signal being periodic and having at least a first time period for detection of a capacity variation and a second time period for displacement of the movable electrode to implement self diagnosis;
  a C-V conversion circuit for generating a voltage which depends on a variation in a capacitance of the capacitor during the first time period;
  a signal processing circuit for processing the voltage generated by the C-V conversion circuit into a second signal depending on the physical quantity; and
  changing means for changing the first signal in the second time period between a state for execution of self diagnosis and a state for unexecution of self diagnosis;
  wherein the first signal in the state for execution of self diagnosis applies a pseudo physical quantity to the movable electrode, and a frequency of the first signal is higher than a resonance frequency of the movable electrode in a direction of displacement of the movable electrode.

* * * * *